United States Patent [19]  
Arai

[11] Patent Number: 4,571,019  
[45] Date of Patent: Feb. 18, 1986

[54] CONNECTING TERMINAL

[75] Inventor: Junichi Arai, Gifu, Japan

[73] Assignee: Mitsubishi Denki Kabushiki Kaisha, Tokyo, Japan

[21] Appl. No.: 448,879

[22] Filed: Dec. 10, 1982

[30] Foreign Application Priority Data

Dec. 17, 1981 [JP] Japan .................. 56-188373[U]  
Feb. 8, 1982 [JP] Japan .................. 57-16079[U]

[51] Int. Cl.⁴ .............................................. H01R 4/16  
[52] U.S. Cl. ............................... 339/276 R; 24/129 B  
[58] Field of Search ............. 339/95 D, 97 C, 103 R, 339/103 B, 276 S, 276 T, 276 R; 24/115 R, 129 R, 129 B

[56] References Cited

U.S. PATENT DOCUMENTS

| | | | |
|---|---|---|---|
| 1,647,762 | 11/1927 | Wiseman | 339/276 R |
| 1,706,412 | 3/1929 | Roberts | 339/276 R |
| 3,520,004 | 7/1970 | Patnaude | 24/129 R |
| 3,575,371 | 4/1971 | Carlstedt | 29/129 B |
| 3,976,385 | 8/1976 | Klopfer | 339/276 R |
| 4,263,474 | 4/1981 | Tennant | 339/97 C |

FOREIGN PATENT DOCUMENTS 2249258  4/1973  Fed. Rep. of Germany ... 339/276 A

Primary Examiner—Gil Weidenfeld  
Assistant Examiner—Paula A. Austin  
Attorney, Agent, or Firm—Sughrue, Mion, Zinn, Macpeak & Seas

[57] ABSTRACT

A connecting terminal of electrically conductive material is in the form of a flat plate having first and second tabs which are stamped from the plate and bent upwardly from the same surface of the plate. The first tab is reversely bent to overlie the plate in spaced substantially parallel relation thereto for receiving an insulated wire and the second tab is disposed at an acute angle to the plate and is directed opposite to the first tab for anchoring the free end of the wire to the terminal. The first tab is provided with an elongated slot in the bent portion thereof so that on subsequent clamping of the wire by the application of pressure by opposed electrodes and the passage of current through the electrodes, the insulation will be burned off the wire under the first tab. The elongated slot allows for the escape of gasses and burned insulation material so as to insure a good electrical connection between the conductive core of the wire and the terminal.

2 Claims, 17 Drawing Figures

CONNECTING TERMINAL

BACKGROUND OF THE INVENTION

The present invention is directed to a connecting terminal of the type having a reversely bent tab stamped therefrom for engaging a wire having an insulating cover whereby upon application of heat and pressure the insulating cover is burned off and the wire is welded to the terminal to electrically connect the wire to the terminal.

In the prior art method shown in FIGS. 1-4, the connecting terminal 1 is obtained by blanking an electrically conductive metal plate such as a copper or copper alloy plate, to obtain a tab 2 which is reversely bent into spaced parallel relation with the plate thereby defining a hook-like portion as best seen in FIGS. 2a and 2b.

An insulated wire 3 connected to an electrical apparatus 5 such as the starter of an electric motor, is connected to the terminal 1 by placing the wire in the bight 2a of the hook-like member 2 with the insulating cover 3a of the wire in firm, intimate contact with the bent portion 2b of the hook-like member as best seen in FIG. 3. With the wire 3 held in this position, the hook-like member 2 is pressed downwardly into engagement with the terminal plate 1 by means of opposed electrode bars 4. A current is then applied to the electrode bars 4 whereupon heat is generated due to the resistance of the terminal plate to burn through the insulating cover 3a and bring the core 3b of the wire into intimate electrical contact with the terminal plate 1 and the reversely bent hook-like member 2 as best seen in FIG. 4. However, in such an operation, foreign material 6 such as unburned parts, oxides or carbides of the insulating cover 3a, may be trapped between the conductive core 3b of the wire and the reversely bent hook-like member 2 as shown in FIG. 4. Since the foreign material 6 acts an electrical insulater or semi-conductor, the foreign material may obstruct a satisfactory electrical connection between the conductive core 3b and the connecting terminal 1. Furthermore, it is difficult to hold the insulated wire in the proper position relative to the reversely bent hook-like member 2 in order to obtain the best possible electrical connection upon application of current and pressure by means of the electrodes 4. Generally, the insulated wire is held by hand which presents a safety problem as well as being disadvantageous from the efficiency point of view.

SUMMARY OF THE INVENTION

Accordingly, an object of the present invention is to provide a connecting terminal having a suitable wire clamping element for engaging the insulated wire at a suitable position relative to the reversely bent hook-like member so that the insulated wire will be properly positioned and securely held in the proper position for the subsequent operation of the electrodes. In accordance with the present invention, it is only necessary to lay the insulated wire into the bight of the reversely bent hook-like member and bend the free end of the wire into engagement with the clamping piece. Thus it will no longer be necessary to manually hold the wire in proper position relative to the reversely bent hook-like member.

A further object of the present invention is to provide a connecting terminal having an elongated hole punched in the reversely bent hook-like member so that upon passage of current through the clamping electrodes the residue resulting from the burning of the insulation can pass outwardly through the hole so as not to interfere with the obtaining of a good electrical contact between the conductive core of the wire and the reversely bent hook-like member on the terminal.

The foregoing and other objects, features, and advantages of the present invention will be apparent from the following more particular description of preferred embodiments of the invention as illustrated in the accompanying drawings.

BRIEF DESCRIPTION OF THE DRAWINGS

FIG. 2b is a side elevation view of the prior art connecting terminal in FIG. 2a.

FIG. 2c is a top plan view of the prior art connecting terminal shown in FIG. 2a.

FIG. 6b is a side elevation view of the connecting terminal as shown in FIG. 6a.

FIG. 6c is a top plan view of the connecting terminal shown in FIG. 6a.

FIG. 8b is a side elevation view of the connecting terminal shown in 8a.

FIG. 8c is a top plan view of the connecting terminal shown in FIG. 8a.

FIG. 9b is a side elevation view of the connecting element shown in FIG. 9a.

FIG. 9c is a top plan view of the connecting element shown in FIG. 9a.

DETAILED DESCRIPTION OF THE INVENTION

Figure 1:
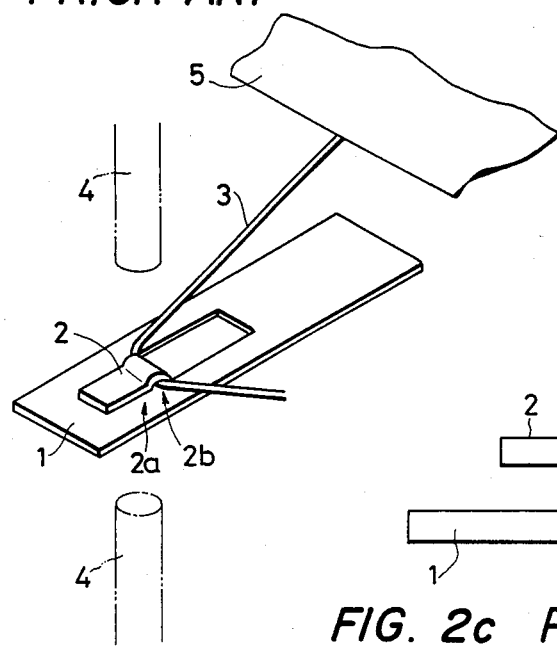
FIG. 1 is a perspective view of a prior art connecting terminal with a wire connected thereto and the electrodes shown in phantom lines.
Figure 2A:
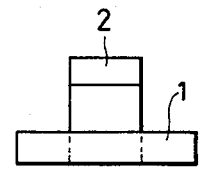
FIG. 2a is an end elevation view of the prior art connecting terminal of FIG. 1 prior to the connection of a wire thereto.
Figure 2B:
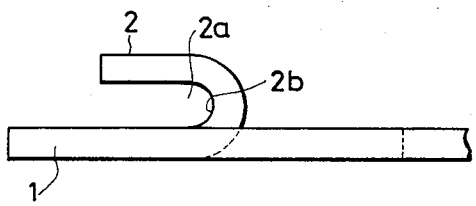
Figure 2C:
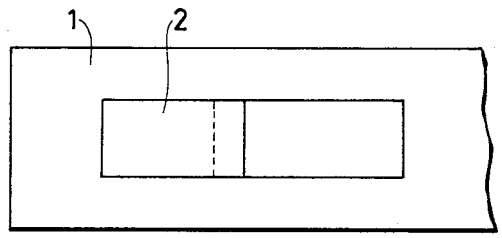
Figure 5:
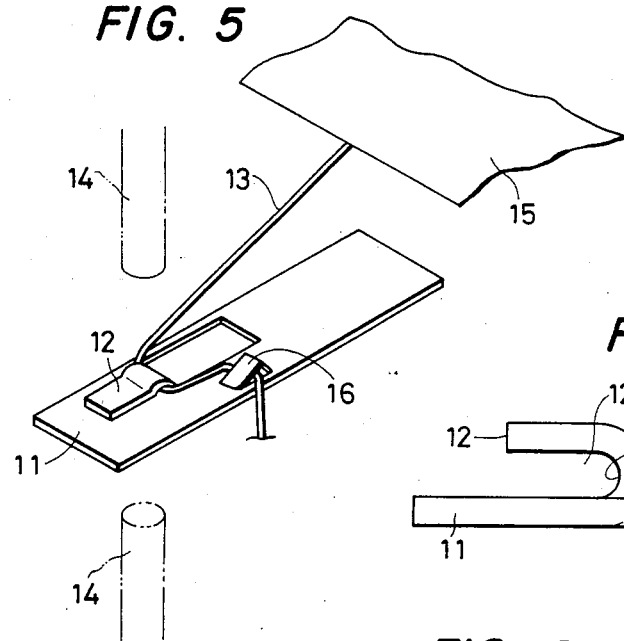
FIG. 5 is a perspective view of the connecting terminal according to the present invention with a wire connected thereto and disposed in engagement with the clamping piece.
Figure 6A:
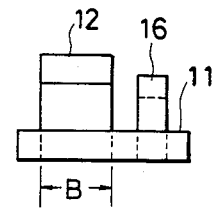
FIG. 6a is an end elevation view of the connecting terminal per se according to the present invention.
Figure 6B:
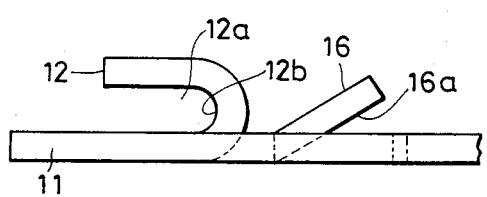
Figure 6C:
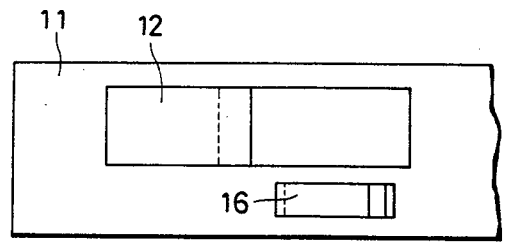

In the embodiment of the invention shown in FIGS. 5 and 6 the connecting terminal 11 is similar to the connecting terminal shown in FIG. 1 inasmuch as it is provided with a stamped tab 12 which is reversely bent into engagement with the terminal plate 11 for the purpose of electrically connecting the wire 13 to the terminal plate 11 by means of the electrodes 14. Additionally, the terminal plate 11 is provided with a clamping piece 16 which is stamped from the terminal plate 11 and bent upwardly to form an acute angle with the terminal plate 11.

Figure 3:
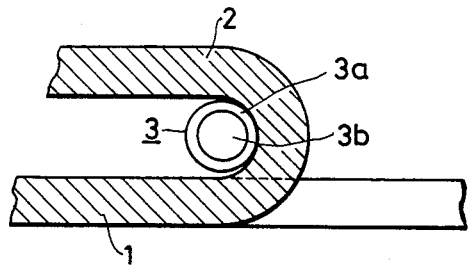
FIG. 3 is a partial sectional view of the prior art connecting terminal with the wire in position prior to the clamping and heating operation.
Figure 4:
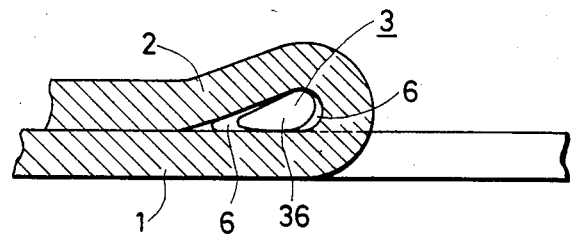
FIG. 4 is a partial sectional view similar to FIG. 3 showing the wire connected to the terminal subsequent to the clamping and heating operation.

In order to electrically connect an insulated wire to the connecting terminal 11, the insulated wire 13 which extends from an electrical device 15 is passed beneath the reversely bent tab or hook-like member 12 similar to the manner shown in FIG. 3. The free end of the wire 13 is then passed under the clamping piece 16 such that the wire 13 will be wedged between the upper surface of the terminal plate 11 and the under surface 16a of the clamping piece 6. With the wire securely clamped by means of the clamping piece 16 it is no longer necessary to hold the wire in the opening 12a against the surface 12b of the hook-like member 12. Upon application of pressure on the hook-like member 12 and the connecting terminal 11 by means of the electrodes 14 the wire 13 will be captured and upon passage of current through the electrodes 14 the insulation on the wire 13 will be burned off in the vicinity of the hook-like member 12 so that the conductive core of the wire will be electrically connected to the connecting terminal 11. Thus, the safety factor and operating efficiency are both increased during the welding operation of the wire to the connecting terminal.

Figure 7:
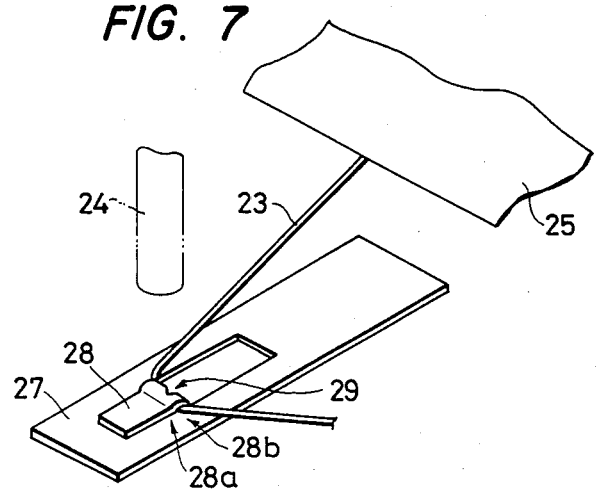
FIG. 7 is a perspective view showing another embodiment of the connecting terminal according to the present invention with a wire connected thereto.
Figure 8A:
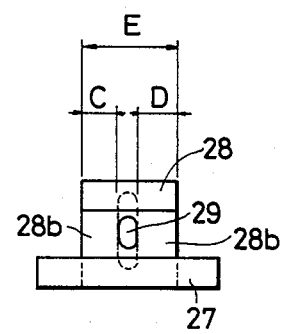
FIG. 8a is an end elevation view of the connecting terminal shown in FIG. 7 prior to the connection of the wire thereto.
Figure 8B:
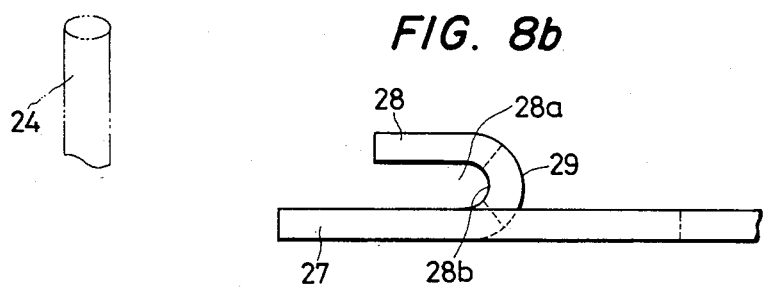
Figure 8C:
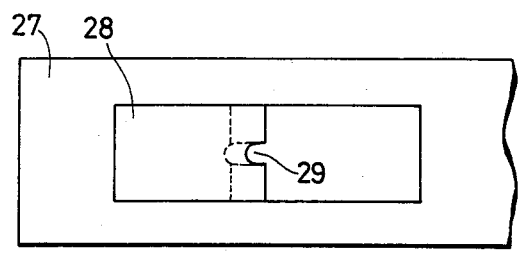

In another embodiment of the present invention shown in FIGS. 7 and 8 the connecting terminal 27 is similar to the prior art connecting terminal and the manner in which the insulated wire 23 is connected to the connecting terminal 27 by means of a reversely bent hook-like member 28 is substantially the same. However, the tab which is stamped from the connecting terminal 27 to form the reversely bent hook-like member 28 is provided with an elongated hole 29. In order to provide adequate surface contact of the insulated wire 27 with the reversely bent hook-like member 28 at 28b the over-all width E of the hook-like member 28 is greater than the width B of the hook-like member 12 in the previous embodiment in order to compensate for the presence of the hole 29. It is preferable that the width (C+D) of the portions 28b of the hook-like member 28 is equal to the width B of the hook-like member 12 as shown in FIG. 6a. Therefore, during the application of pressure and current by means of the electrodes 24, 24, the heat generation and the mechanical strength of the ultimate connection are not lowered. The provision of the hole 29 allows the escape of burning gasses and burned particles of the insulation to facilitate a better electrical connection between the hook-like member 28 and the conductive core of the wire 23. The method of connecting the wire 23 to the terminal 27 is substantially the same as that indicated in the previous embodiment. The insulated wire 23 is placed at 28a under the hook-like member in contact with the surfaces 28b. Upon movement of the electrodes 24 towards each other the hook-like member 28 will be pressed into engagement with the upper surface of the terminal 27 thereby clamping the wire. Upon passage of current between the electrodes 24 the insulation on the wire will be burned off. As the remnants of the insulating material are scattered upon being burned and gasified, some of the scattered particles can pass through the hole 29 so as to substantially eliminate foreign material along that length of the wire 23 under the hook-like member 28. Thus, the bare conductive core of the wire 23 can be readily and efficiently welded to the connecting terminal.

Figure 9A:
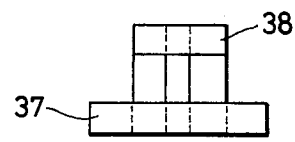
FIG. 9a is a further embodiment of a connecting element per se according to the present invention showing an end elevation view thereof.
Figure 9B:
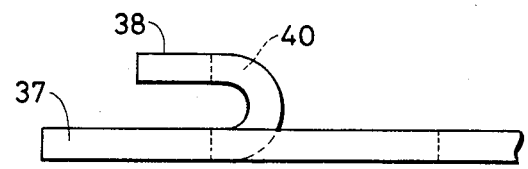
Figure 9C:
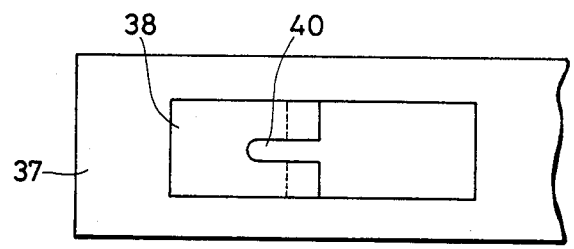

In the embodiment of FIG. 9, the connecting terminal 37 is substantially identical to the connecting terminal 27 with the exception of the hole through the hook-like member 38. The hole 40 is considerably longer than the hole 29 in the previous embodiment so that upon reversely bending the hook-like member 38 the ends of the rectilinear hole 40 will be substantially aligned with each other perpendicular to the upper surface of the terminal 37. The greater length of the hole 40 provides for a better dissipation of the burned foreign material and gasses during the passage of current from one electrode to the other.

It is obvious that the connecting terminals 27 and 37 in the embodiments of FIGS. 7-9, could be provided with a clamping piece similar to the clamping piece 16 in the embodiment of FIGS. 5 and 6. Likewise, the hook-like member 12 in the embodiment of FIGS. 5 and 6 could be provided with an elongated hole similar to either of the holes disclosed in FIGS. 7-9.

While the invention has been particularly shown and described with reference with preferred embodiments thereof, it will be understood by those in the art that various changes in form and details may be made therein without departing from the spirit and scope of the invention.

What is claimed is:

1. A connecting terminal comprising plate means having a hook-like tab member protruding from one surface thereof and extending over said plate means in spaced substantially parallel relation thereto for receiving an insulated wire thereunder, means defining an elongated aperture in the bight of said hook-like tab member to facilitate the dispersal of gases and insulating residue during a subsequent fusing operation of said wire to said terminal and clamping means protruding from the same surface of said plate means as said hook-like tab member for securing the free end of said wire to said terminal, said clamping means being comprised of a piece protruding from said one surface of said plate means at an acute angle thereto and facing in the opposite direction from said hook-like tab member.

2. A connecting terminal as set forth in claim 1 wherein said tab member and said piece are of one-piece integral construction with said plate means which is of electrically conductive material.

* * * * *